United States Patent [19]

Logan

[11] 4,137,938
[45] Feb. 6, 1979

[54] METHOD AND APPARATUS FOR TRANSMITTING LIQUID SUPHUR OVER LONG DISTANCES

[76] Inventor: Robert E. A. Logan, 827-5th Ave., SW., Calgary, Canada, T2P 0N6

[21] Appl. No.: 769,545

[22] Filed: Feb. 17, 1977

[30] Foreign Application Priority Data

Mar. 2, 1976 [CA] Canada .................................. 246925

[51] Int. Cl.² ............................................. F16L 53/00
[52] U.S. Cl. .................................. 137/340; 23/293 S; 165/47; 165/81
[58] Field of Search ................. 138/32, 103, 111, 112, 138/113, 114; 62/55; 137/13, 92, 340, 334; 299/6, 7, 14, 3, 4; 166/57, 302, 303; 165/45, 105; 23/293 S

[56] References Cited

U.S. PATENT DOCUMENTS

| 3,169,576 | 2/1965 | Lee et al. ............................. 138/113 |
| 3,537,515 | 11/1970 | Byrd .................................... 165/105 |

Primary Examiner—Ronald H. Lazarus
Assistant Examiner—Margaret LaTulip
Attorney, Agent, or Firm—Stanley G. Ade

[57] ABSTRACT

Movement of liquid sulphur requires a considerable heat source to maintain the sulphur in liquid form. The present application and method utilizes an outer steel pipe having a liquid sulphur inlet at one end and a liquid sulphur outlet at the other end and at least one heating fluid carrying conduit extending through the outer pipe. Liquid sulphur is pumped in at one end and the majority of this liquid sulphur is maintained in the molten state through out the length of the pipe line by the heating liquid carrying conduit. However an annular shell of solidified sulphur is allowed to form in contact with the inner surface of the wall of the outer pipe so that it acts as a thermal insulator and assists in maintaining the sulphur that is remaining in the liquid state. Thrust blocks are required along the length of the liquid carrying conduit to limit end shifting and expansion and contraction means are provided along the length of the heating liquid carrying conduit to take up longitudinal movement between adjacent thrust blocks. Means are provided to remove the liquid within the heating liquid carrying conduit at stages along the length thereof, so that this liquid may be reheated and returned to the heating liquid carrying conduit.

22 Claims, 7 Drawing Figures

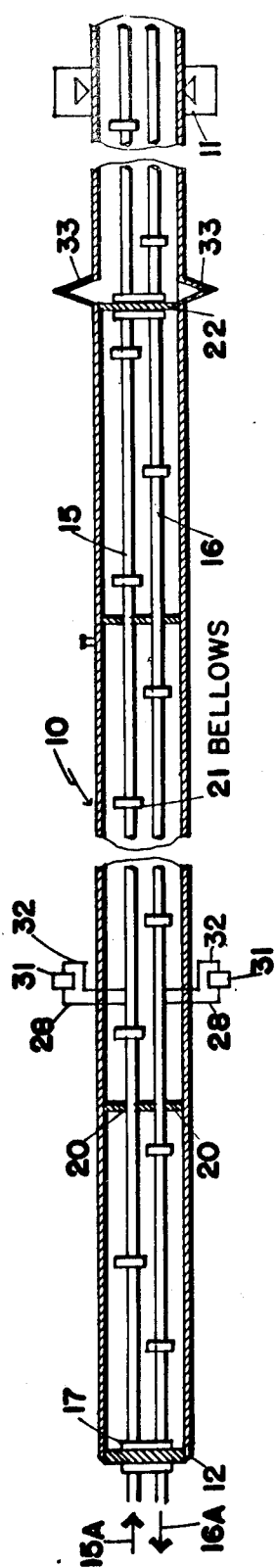
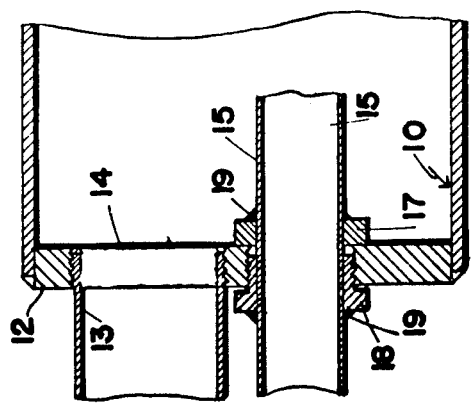
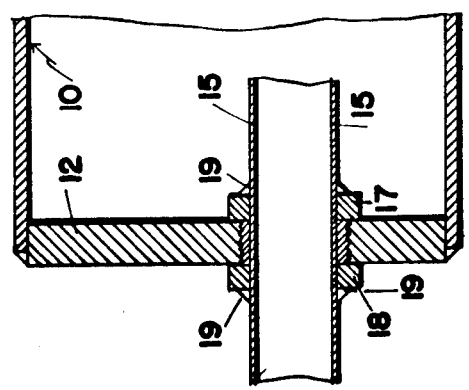
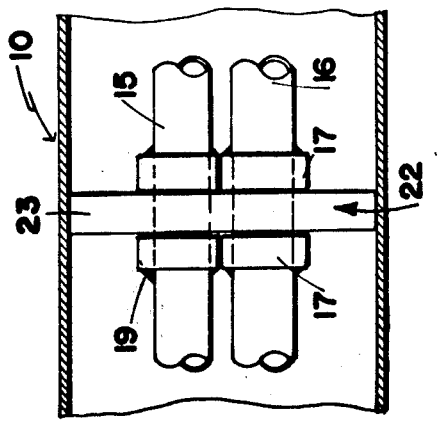

METHOD AND APPARATUS FOR TRANSMITTING LIQUID SUPHUR OVER LONG DISTANCES

BACKGROUND OF THE INVENTION

This invention relates to new and useful improvements in the transmission of sulphur.

The transmission of powdered elemental sulphur is extremely difficult because of the consistency thereof and it is usually transported in tank cars or trucks.

Elemental sulphur is obviously more easily transportable over long distances if same is molten, but difficulty is encountered in maintaining the sulphur in a molten state in an economical fashion. It is more easily loaded into rail cars situated at railway sidings several miles from gas plants, if the sulphur can be transmitted from the gas plant to the rail car in a molten state.

SUMMARY OF THE INVENTION

The present invention overcomes the disadvantages normally present by providing an outer conduit into which molten sulphur is pumped. The sulphur is maintained in the molten state by passing one or more heating liquid carrying conduits substantially coaxially throughout the length of the main conduit. The temperature of the heating liquid is preferably sufficient to maintain the sulfur within the conduit, at a molten state with the exception of an outer shell which is allowed to solidify to a thickness of several inches. The acts as an excellent thermal barrier or insulator since solidified sulphur has a low co-efficient of heat transfer.

The principal object and essence of the invention is therefore to provide a method and apparatus of the character herewithin described which enables molten sulphur to be transferred through a pipeline over considerably distances with the sulfur being maintained in the desired molten state throughout the length of the pipeline.

Another object of the invention is to provide a method and apparatus of the character herewithin described in which an outer shell of molten sulphur is permitted to solidify against the inner surface of the wall of the main conduit thus acting as a thermal insulator.

A still further object of the invention is to provide a method and apparatus of the character herewithin described which includes means for maintaining the temperature of the heating liquid throughout the length of the pipeline.

A still further object of the invention is to provide a method and apparatus of the character herewithin described in which the conduits carrying the heating liquid are provided with the necessary supports and thrust plates along the length of the pipeline in order to provide stability to the construction and prevent leakage occurring.

Still another object of the invention is to provide a method and apparatus of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 is a partially schematic plan section of a pipeline incorporating the present invention.

FIG. 2 is an enlarged fragmentary cross sectional view of the main pipeline showing the thrust collars and thrust plate.

FIG. 3 is a fragmentary sectional view of one end of the pipeline.

In the drawings like characters of reference indicate corresponding parts in the different figures.

DETAILED DESCRIPTION

Figure 7:
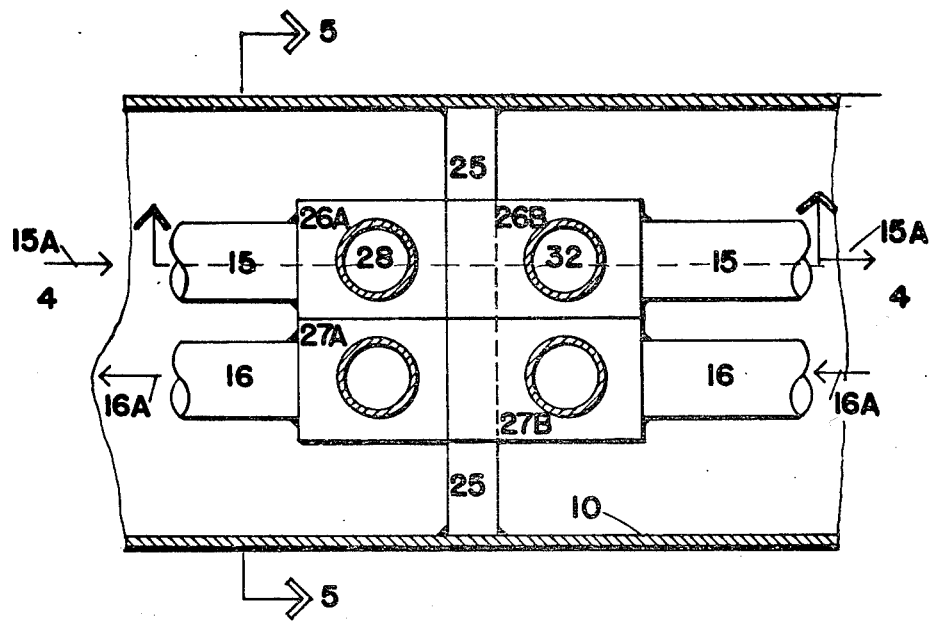
FIG. 7 is a cross sectional view along the line 7—7 of FIG. 4.

Proceeding therefore to describe the invention in detail, reference should first be made to FIG. 1 in which 10 illustrates the main or outer conduit and which is manufactured preferably from steel. This main conduit is normally buried in the ground and is supported by anchors or cradles 11 shown schematically in FIG. 1, to prevent sideways displacement of the pipeline due to frost heaving or the like and allow expansion bellows in the main conduit to function as a unit between each anchor.

The main conduit 10 is provided with end plates 12, one at the inner end shown in FIGS. 1 and 3, and one at the outer end (not illustrated). A liquid sulphur inlet pipe 13 is screw threadably engaged within an aperture 14 formed within the end plate 12 and a similar pipe 13, can be used as a liquid sulphur outlet at the opposite end (not illustrated).

The sulphur is pumped in at the end 13 and pumped through the pipeline to exit at the other end and of course it is necessary to provide means to maintain the sulphur in the molten state throughout the length of the pipeline or conduit 10.

In this particular embodiment, a pair of heating liquid conduits 15 and 16 are provided, conduit 15 carrying a heating fluid or liquid (not illustrated) in the direction of arrow 15A and conduit 16 carrying the liquid or heating fluid along a return path in the direction of arrow 16A.

Each of these conduits is similar in construction and FIG. 3 shows a method of engaging the conduit 15 or 16 through the end plates 12. It is desirable that these conduits 15 and 16 by made of aluminium for the heat transfer capabilities of aluminium so that a collar 17 made of a similar substance, is welded to the conduit 15 or 16 inboard of the end plates 12 and engaging the inner surface of the end plate around the aperture within the end plate through which conduit 15 passes. A screw threaded hexagon head nipple 18 is then screw threadably engaged within the screw threaded aperture making a sealed connection in the thread whereupon it is seal welded into position by welding bead 19 shown in FIG. 3. This seals the conduits 15 and 16 within the end plates as clearly shown.

The conduits 15 and 16 are supported substantially coaxially throughout the length of the outer conduit 10, by means of spider type supports 20 shown schematically in FIG. 1.

Because the conduits 15 and 16 are formed from aluminium, expansion and contraction means are required in order to allow for longitudinal expansion and contraction of these conduits relative to the steel outer casing 10. Reference character 21 illustrates these in FIG. 1 and they may take any convenient form such as bellows manufactured into the conduit. However, it has been found satisfactory to bell both ends of lengths of conduits 15 and 16 and then join the outwardly flared bells around the periphery thereof as by welding thus forming a small aluminium bellow at these points which is sufficient to allow the necessary movement of the conduits 15 and 16.

Figure 6:
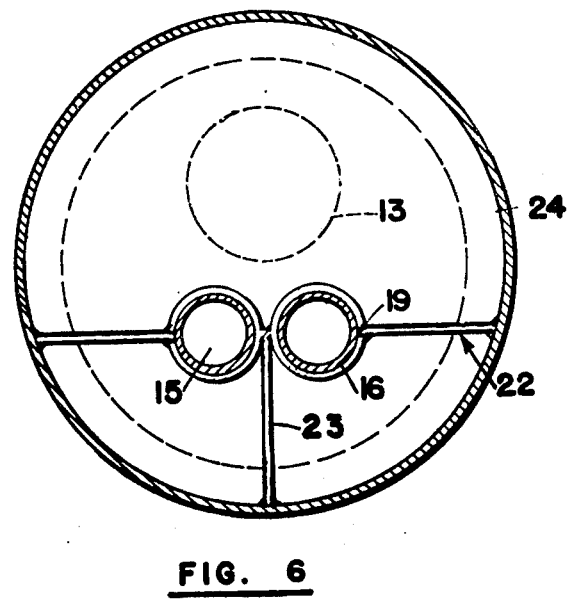
FIG. 6 is a cross sectional end view of FIG. 2.

Furthermore, it has been found desirable to provide thrust plates and thrust collars in order to limit the longitudinal movement of these conduits to sections of the pipeline between such thrust plates. FIGS. 2 and 6 show these thrust plates 22 which include a plurality of fins 23 welded to the inner wall 24 of the outer casing 10 and extending inwardly to be welded to steel collars 17 around the conduits 15 and 16 as shown in FIG. 6, but only fitted adjacent to the steel bellows 33. This is to allow welding during construction.

Collars 17 similar to that illustrated in FIG. 3, are then engaged around each of the conduits 15 and 16 and welded into position upon the conduits as indicated by the welds 19A and these collars engage thrust plate 22 and limit the amount of movement between adjacent thrust plates along the length of the pipeline.

Figure 4:
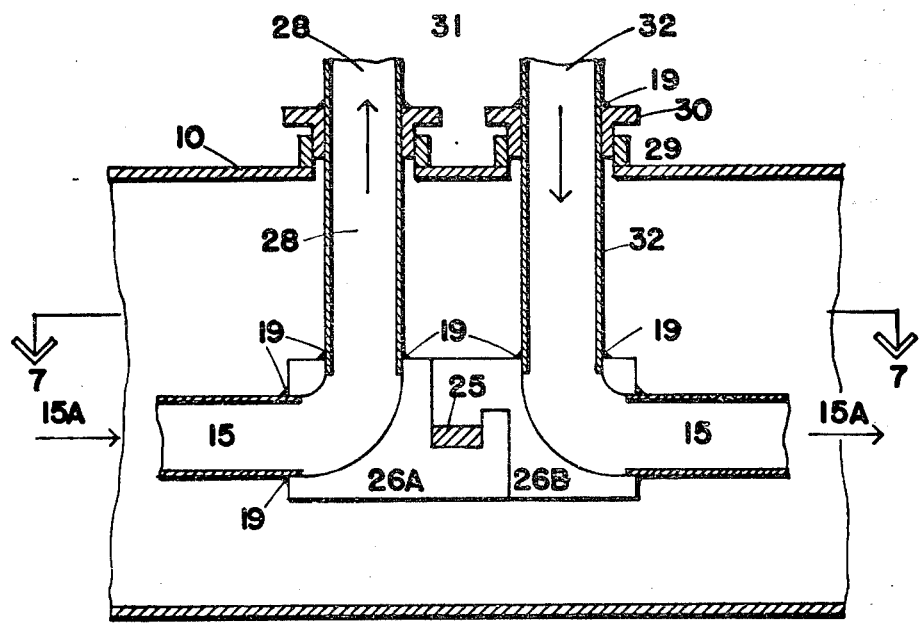
FIG. 4 is a fragmentary cross sectional view along the line 4—4 of FIG. 5 and FIG. 7.
Figure 5:
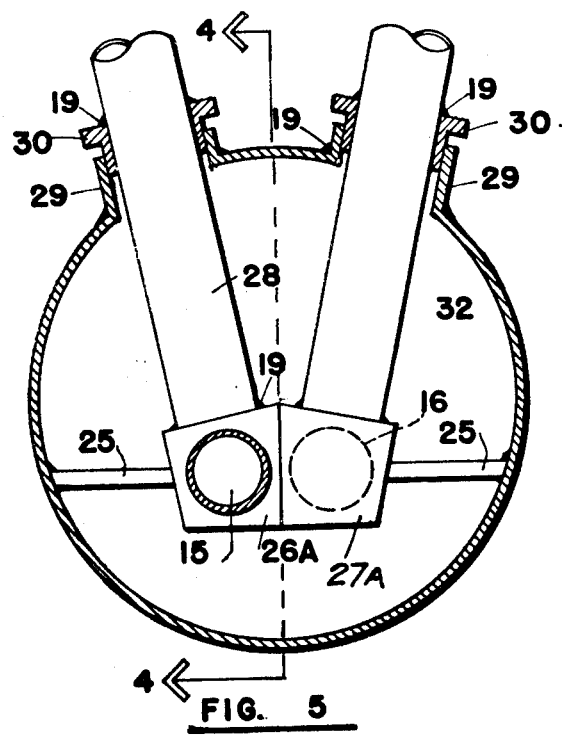
FIG. 5 is a cross sectional view of FIG. 4 substantially along the line 5—5 of FIG. 7.

It is necessary to maintain the temperature of the heating liquid within the conduits 15 and 16, said heating liquid taking the form of either oil or glycol or some similar material and in this connection, reference should be made to FIGS. 4 and 5.

At selected intervals along the length of the main conduit 10, the fluid or liquid is removed from the pipeline assembly, reheated by conventional means and then replaced. In this connection, there is provided a special or modified thrust plate 25 secured to the inner wall of the main conduit 10. Elbows 26A, 26B, 27A, 27B are formed of aluminium and interlock with the thrust plate 25 as shown in FIG. 4 so that these elbows can be supported on thrust plate 25 and cannot be displaced therefrom.

The elbow 26A acts as an outlet elbow in the present embodiment and one end of the heating liquid carrying conduit 15 terminates within one end of this elbow and is welded into position by means of welding bead 19 as clearly shown.

An outlet conduit 28 is welded into position within the other end of the elbow 26A, said other end communicating with the first mentioned end, and this outlet conduit extends through a steel collar 29 welded around an aperture formed within the wall of the main conduit 10. Aluminium hexagonal nipple 30 is screw threadably engaged within the collar and surrounds the outlet conduit 28 and is welded into position as illustrated thus sealably supporting the outlet conduit 28 through the wall of the main pipeline or outer conduit 10.

This outlet conduit extends to a conventional heating means shown schematically in FIG. 1 by reference character 31. Here the heating liquid is reheated to the desired temperature and then transferred to a reinlet inlet conduit 32 which passes through the wall 10 in a manner similar to the outlet conduit and connects to the reinlet elbow 26B at one end thereof and is welded into position as shown.

The liquid carrying conduit 15 then extends from the other end of the inlet elbow 26B and is welded into position so that the conduit continues in alignment with the portion 15 thus maintaining the sulphur within the pipeline, in a liquid or molten state.

If desired, an expansion bellow 33 may be provided at intervals along the length of the main pipeline 10 depending upon design parameters in order to allow for the minor expansion and contraction which might occur to this outer pipeline.

In operation, the heating liquid or fluid passing through conduits 15 and 16 is maintained at a pre-determined temperature by means of the various booster or heating stations 31 situated along the pipeline. This liquid passes through the conduit 15 in one direction and is returned by conventional pumping means back through conduit 16.

The liquid sulphur is pumped into the pipeline at approximately 280° F. through steel conduit 13 and the majority of this liquid sulphur is maintained in a molten state by the heating liquid passing through conduits 15 and 16.

However, it is desirable that the temperature be controlled so that the outer shell of sulphur solidifies against the inner surface 24 of the main conduit 10 and builds up to a thickness of one or two inches depending upon the diameter of the main conduit 10 whereupon it acts as an excellent thermal insulator due to the relatively low co-efficient of heat transfer of solid sulphur.

In the event of an extended shutdown of the heat supply and the conduits 15 and 16, the liquid therein would have to be heated sufficiently to liquefy the sulphur adjacent these conduits and to extend this liquefication to such an extent that pumping can commence even in a much reduced quantity. The combination of the heat from the heating conduits and from the fresh molten sulphur at approximately 280° F. will soon increase the pumping rate to normal.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A pipeline for the transmission of molten sulphur comprising in combination an outer conduit, molten sulphur inlet means at one end of said conduit and molten sulphur outlet means at the other end of said conduit, and means to maintain the majority of the sulphur within said conduit, in a molten state, said means including at least one heating liquid conduit extending lengthwise through said outer conduit to maintain the majority of said molten sulphur in a molten state.

2. The invention according to claim 1 in which said heating liquid carrying conduit includes a pair of conduits, one carrying heating liquid in one direction along the length of the outer conduit, and the other carrying heating liquid in the other direction along the length of the outer conduit, said heating liquid carrying conduits including means to support same spaced from the walls of said outer conduit.

3. The invention according to claim 1 which includes means to remove and return the liquid in said heating liquid carrying conduit, stages along the length of said outer conduit whereby the liquid can be re-heated.

4. The invention according to claim 2 which includes means to remove and return the liquid in said heating liquid carrying conduit, stages along the length of said outer conduit whereby the liquid can be re-heated.

5. The invention according to claim 1 which includes at least one thrust plate for said heating liquid carrying conduit along the length of said heating liquid carrying conduit, said thrust plate being secured within said outer conduit, and a thrust collar secured around said heating liquid carrying conduit on each side of said thrust plate and engaging said thrust plate.

6. The invention according to claim 2 which includes at least one thrust plate for said heating liquid carrying conduit along the length of said heating liquid carrying conduit, said thrust plate being secured within said outer conduit, and a thrust collar secured around said heating liquid carrying conduit on each side of said thrust plate and engaging said thrust plate.

7. The invention according to claim 3 which includes at least one thrust plate for said heating liquid carrying conduit along the length of said heating liquid carrying conduit, said thrust plate being secured within said outer conduit, and a thrust collar secured around said heating liquid carrying conduit on each side of said thrust plate and engaging said thrust plate.

8. The invention according to claim 4 which includes at least one thrust plate for said heating liquid carrying conduit along the length of said heating liquid carrying conduit, said thrust plate being secured within said outer conduit, and a thrust collar secured around said heating liquid carrying conduit on each side of said thrust plate and engaging said thrust plate.

9. The invention according to claim 3 in which said means to remove and return the liquid in said heating liquid carrying conduit includes a combination thrust and conduit elbow assembly within said outer conduit, said combination thrust and conduit elbow assembly including a thrust plate secured within said outer conduit, and outlet elbow for said heating liquid carrying conduit secured to said thrust plate, the end of said heating liquid carrying conduit being secured to one side of said elbow, an outlet conduit extending from the other side of said elbow and communicating with said one side, said outlet conduit extending through the wall of said outer conduit, an inlet elbow also secured to said thrust plate, an inlet conduit extending through the wall of said outer conduit and being secured to one side of said inlet elbow and a further heating liquid carrying conduit continuing through said outer conduit and being secured by one end thereof to the other side of said inlet elbow and communicating with said one side, and means to seal the junction of said inlet and outlet conduits within the wall of said outer conduit.

10. The invention according to claim 7 in which said means to remove and return the liquid in said heating liquid carrying conduit includes a combination thrust and conduit elbow assembly within said outer conduit, said combination thrust and conduit elbow assembly including a thrust plate secured within said outer conduit, and outlet elbow for said heating liquid carrying conduit secured to said thrust plate, the end of said heating liquid carrying conduit being secured to one side of said elbow, an outlet conduit extending from the other side of said elbow and communicating with said one side, said outlet conduit extending through the wall of said outer conduit, an inlet elbow also secured to said thrust plate, an inlet conduit extending through the wall of said outer conduit and being secured to one side of said inlet elbow and a further heating liquid carrying conduit continuing through said outer conduit and being secured by one end thereof to the other side of said inlet elbow and communicating with said one side, and means to seal the junction of said inlet and outlet conduits within the wall of said outer conduit.

11. The invention according to claim 8 in which said means to remove and return the liquid in said heating liquid carrying conduit includes a combination thrust and conduit elbow assembly within said outer conduit, said combination thrust and conduit elbow assembly including a thrust plate secured within said outer conduit, and outlet elbow for said heating liquid carrying conduit secured to said thrust plate, the end of said heating liquid carrying conduit being secured to one side of said elbow, an outlet conduit extending from the other side of said elbow and communicating with said one side, said outlet conduit extending through the wall of said outer conduit, an inlet elbow also secured to said thrust plate, an inlet conduit extending through the wall of said outer conduit and being secured to one side of said inlet elbow and a further heating liquid carrying conduit continuing through said outer conduit and being secured by one end thereof to the other side of said inlet elbow and communicating with said one side, and means to seal the junction of said inlet and outlet conduits within the wall of said outer conduit.

12. The invention according to claim 1 which includes at least one expansion and compression means along the length of said heating liquid carrying conduit.

13. The invention according to claim 2 which includes at least one expansion and compression means along the length of said heating liquid carrying conduit.

14. The invention according to claim 3 which includes at least one expansion and compression means along the length of said heating liquid carrying conduit.

15. The invention according to claim 4 which includes at least one expansion and compression means along the length of said heating liquid carrying conduit.

16. The invention according to claim 5 which includes at least one expansion and compression means along the length of said heating liquid carrying conduit.

17. The invention according to claim 6 which includes at least one expansion and compression means along the length of said heating liquid carrying conduit.

18. The invention according to claim 7 which includes at least one expansion and compressiong means along the length of said heating liquid carrying conduit.

19. The invention according to claim 8 which includes at least one expansion and compression means along the length of said heating liquid carrying conduit.

20. The invention according to claim 9 which includes at least one expansion and compression means along the length of said heating liquid carrying conduit.

21. The invention according to claim 10 which includes at least one expansion and compression means along the length of said heating liquid carrying conduit.

22. The invention according to claim 11 which includes at least one expansion and compression means along the length of said heating liquid carrying conduit.

* * * * *